United States Patent

[11] 3,578,232

| [72] | Inventors | Calvin D. Loyd<br>Peoria;<br>Theodore L. Oberle, Washington; Ronald L. Satzler, Metamora, Ill. |
|---|---|---|
| [21] | Appl. No. | 785,644 |
| [22] | Filed | Dec. 20, 1968 |
| [45] | Patented | May 11, 1971 |
| [73] | Assignee | Caterpillar Tractor Co.<br>Peoria, Ill. |

[54] HYDRAULICALLY LOADED THRUST BEARING ARRANGMENT FOR A FRICTION WELDING MACHINE
8 Claims, 2 Drawing Figs.

[52] U.S. Cl. .................................................. 228/2,
29/470.3, 156/73, 279/4, 308/9
[51] Int. Cl. ......................................................... B23k 27/00
[50] Field of Search ......................................... 228/2;
29/470.3; 156/73; 308/9; 279/4

[56] References Cited
UNITED STATES PATENTS

| 3,412,916 | 11/1968 | Dunlap et al. ............... | 228/2 |
| 3,380,641 | 4/1968 | Deemie et al. ............... | 228/2 |
| 3,349,982 | 10/1967 | Lipp et al. .................... | 228/2 |
| 2,812,186 | 11/1957 | Carlsen et al. ............... | 279/2 |

Primary Examiner—John F. Campbell
Assistant Examiner—Robert J. Craig
Attorney—Fryer, Tjensvold, Feix, Phillips and Lempio

ABSTRACT: A thrust bearing arrangement for use with a shaft which is subject to high rotational speeds and high axial thrust relative to a supporting housing. A number of angular contact thrust bearings are arranged in tandem between the shaft and housing and are independently pressurized by hydraulic fluid for developing equal internal counterbalancing pressure in the bearings. The internal counterbalancing force developed within each bearing is preferably somewhat in excess of the axial force transmitted between the shaft and housing with resilient backup means absorbing at least a portion of the internal counterbalancing force and axially stabilizing the shaft relative to the housing. The bearing arrangement is adaptable to a friction welding machine for use with its spindle and spindle housing with working fluid from a common source delivered both to the bearing and to a hydraulic load cylinder for developing the axial load.

Patented May 11, 1971
3,578,232
2 Sheets-Sheet 1
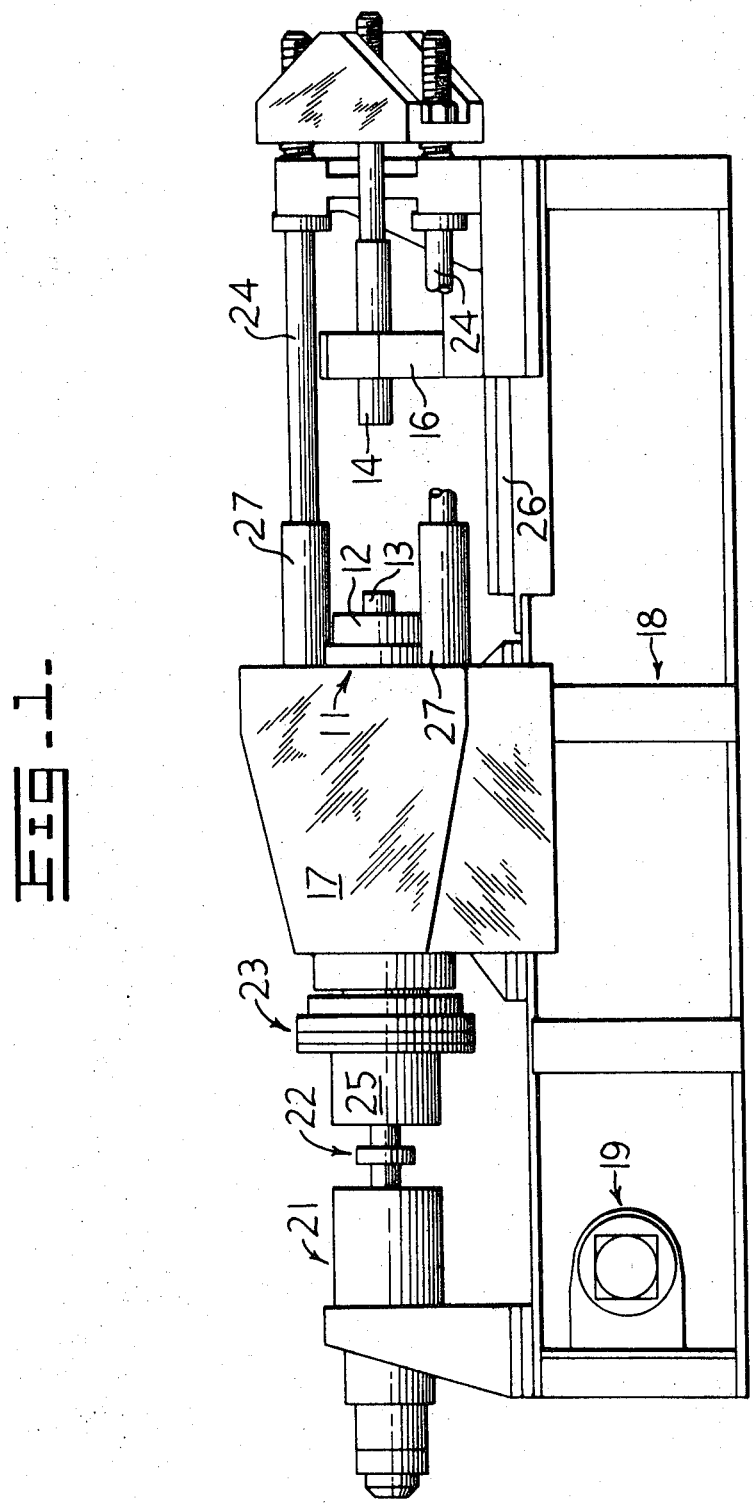
INVENTORS
CALVIN D. LOYD
THEODORE L. OBERLE
RONALD L. SATZLER
BY
ATTORNEYS

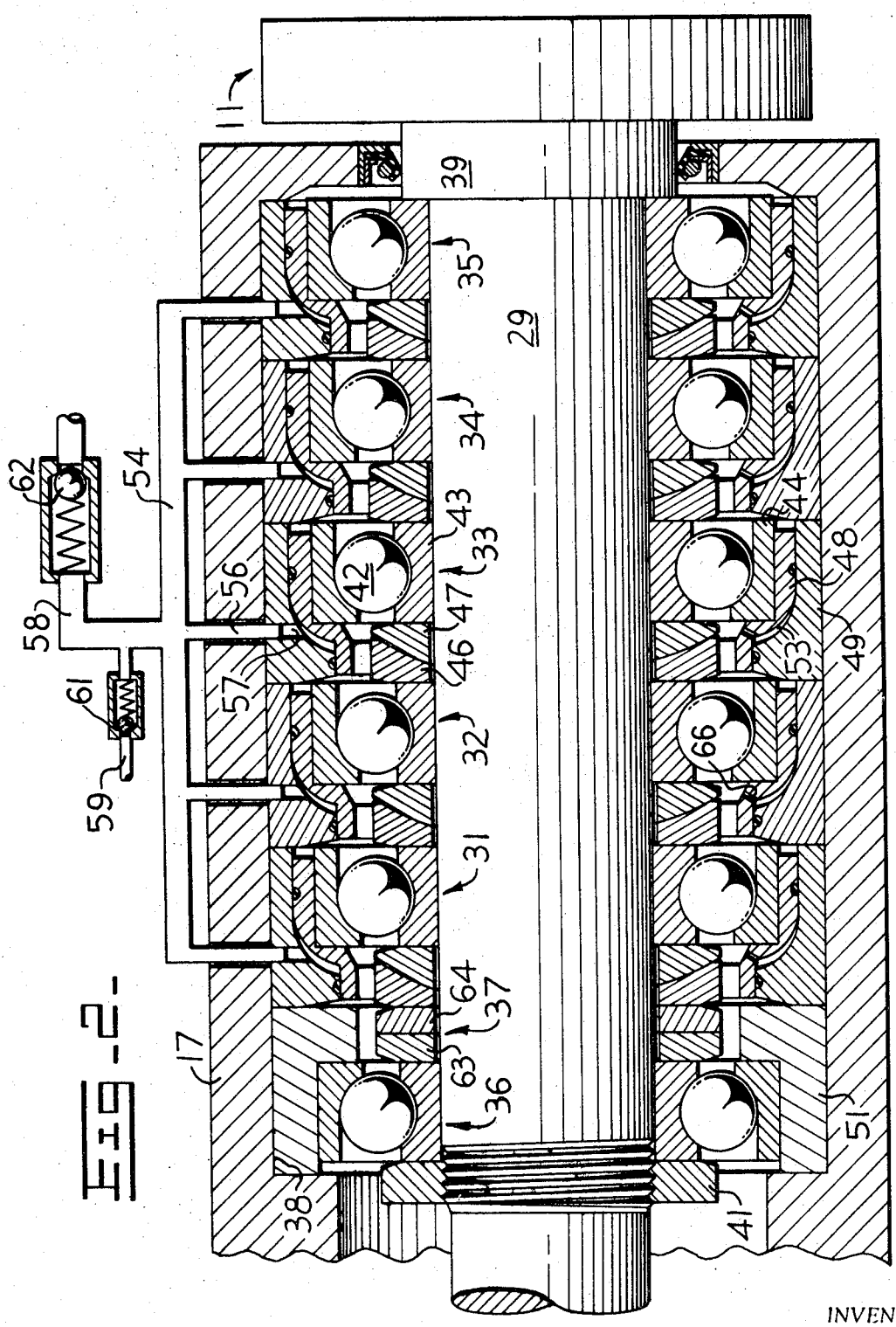
Fig-2-
INVENTORS
CALVIN D. LOYD
THEODORE L. OBERLE
RONALD L. SATZLER

HYDRAULICALLY LOADED THRUST BEARING ARRANGMENT FOR A FRICTION WELDING MACHINE

The present invention relates to hydraulically loaded thrust bearings and more particularly to a bearing arrangement which is adaptable for supporting the spindle of a friction welding machine while withstanding both the high rotational speeds and high thrust loads commonly developed in such machines. Conventional thrust bearings which are designed for high thrust load operation are generally not suitable for operation at high rotational speeds. On the other hand, conventional thrust bearings which are designed for use at high rotational speeds generally will not support high axial thrust loads over long periods of operation.

Examples may be found in the prior art as to the use of a series of thrust bearing assemblies which are employed in tandem with each bearing assembly transmitting only a portion of the total axial thrust. However, these prior art arrangements have not been effective in overcoming the problems developed by such an operating environment. For example, the stacked arrangements of thrust bearings employed in the prior art failed in one or more of the following respects. The initial size, cost and complexity of the bearing arrangement may be inordinately great due to the necessity of employing a large number of the bearing assemblies in tandem. Further, the task of matching the bearing assemblies so that they each support an equal portion of the thrust loads has been generally difficult to achieve. Mismatch in the bearings commonly causes one bearing to assume a proportionately large amount of axial thrust resulting in failure of that particular bearing assembly. In such an event, it is often necessary to replace the entire tandem bearing arrangement with another matched set.

Some of these problems may be clarified by a brief discussion of the requirements for tandem arrangements of thrust bearings. Angular contact ball bearings are a particular type of thrust bearing which are suitable for such applications. Generally, the bearing size is first selected to allow operation at a desired maximum speed of rotation. A sufficient number of these bearings are then stacked in tandem to achieve the desired axial thrust capacity. Within these prior art bearing arrangements, it has generally not been possible to determine the number of stacked bearings merely by dividing the thrust capacity of one bearing assembly into the total axial thrust to be transmitted by the bearing arrangement. This would require perfect matching between the various bearing assemblies of the tandem arrangement so that each bearing assembly would accept an equal portion of the axial thrust load. Even then, uniform load distribution among the bearings could be maintained only for a specific axial thrust load and not over a range of loads. In practice, it has been found necessary to multiply the product of a single bearing capacity and the number of bearings to a power which is substantially less than one. The power would typically be about 0.7, for example.

It is readily apparent that the necessary use of this power increases the number of bearing assemblies employed in tandem and accordingly, increases the probability of bearing failure. It is also apparent that if one of the bearings in a matched set should fail, the total bearing arrangement is considered inoperable because of its matched character. Accordingly, problems of the type discussed above tend to result in shortened operating life and increased time and expense for repair or replacement of the bearing arrangement.

It is a particular object of the present invention to provide a hydraulically loaded tandem thrust bearing arrangement wherein bearings having commercial tolerances can be used while still permitting the individual assemblies of the tandem arrangement to accept an equal proportion of a total axial thrust load.

To further illustrates the advantages of the present invention, an equation for a typical prior art bearing arrangement would be:

Total bearing capacity = single bearing capacity × (number of bearings) 0.7 whereas an equation for a hydraulically loaded bearing arrangement according to the present invention would be:

Total bearing capacity = single bearing capacity × (number of bearings) 1.0. By using the above equations in a standard bearing-life formula, it is apparent that for a five-bearing arrangement, for example, the life of the present bearing system is about 4¼ times the life of a conventional bearing system.

It is a further object of the invention to accomplish this purpose through hydraulic means which independently load each bearing and develop an internal counterbalancing force which is at least approximately equal to the axial force which the bearing arrangement is to transmit.

It is a further object to maintain the internal counterbalancing forces within the individual bearings at a controlled excess relative to total axial thrust in order to axially stabilize the shaft and housing with which the bearing arrangement is associated. Where the bearing arrangement is employed in the spindle and spindle housing of a friction welding machine, this object may be accomplished by appropriate sizing of a piston and cylinder arrangement within each bearing and employing a common source of working fluid for the axial thrust motor of the friction welding machine and for a common manifold which is in separate communication with the piston and cylinder of each bearing assembly.

It is a further object to employ means for hydraulically preloading the tandem bearing assemblies in order to prevent ball skidding within the bearings during acceleration.

Additional objects and advantages of the present invention are made apparent in the following description having reference to the accompanying drawing.

In the drawing:

FIG. 1 is a side view in elevation of a generally conventional inertia friction welding machine, and FIG. 2 is an enlarged view, with parts in section, of a bearing arrangement which may be employed between the spindle and spindle housing of the friction welding machine of FIG. 1.

A friction welding machine of the type illustrated in FIG. 1 has a rotatable spindle generally indicated at 11 to which a spindle chuck 12 is secured for mounting a rotatable workpiece 13. Another workpiece 14 is mounted in alignment with the workpiece 13 by means of a tailstock fixture 16. A spindle housing 17 is mounted upon the welding machine frame 18 and rotatably supports the spindle 11. The spindle 11 together with the spindle chuck 12 and the workpiece 13 are driven in rotation relative to the other workpiece 14 by means of a motor 19, a hydrostatic transmission 21 and a coupling assembly 22 which is interconnected between the spindle 11 and the transmission 21. Flywheel members 23 may be mounted upon the hub 25 to provide variable inertial mass as is common for inertia welding operation. To permit axial engagement of the workpieces 13 and 14 during the welding process, the tailstock 16 is slideably mounted on tie bars 24 and rails 26. A pair of hydraulic rams or motors 27 is extendibly connected between the spindle housing and tailstock fixture 16 and is hydraulically actuated for selectively urging the workpieces 13 and 14 into engagement.

Since operating parameters are critical within a friction welding process carried out by this type of machine, it is important that the spindle 11 which mounts the axially stationery workpiece 13 be maintained at an axially constant position relative to the spindle housing 17. Thus, it is apparent that the spindle 11 must experience very high rotational speeds relative to the housing 17. Further, very large axial forces developed by engagement of the workpieces 13 and 14 must be transmitted between the spindle 11 and the housing 17 without affecting the rotational ability of the spindle or its axial position.

The present invention is particularly concerned with a thrust bearing arrangement for supporting the spindle 11 within the housing 17 while withstanding the high rotational speeds of the spindle as well as the high axial thrust force developed between the spindle and housing 17 by engagement of the workpieces 13 and 14. A preferred embodiment of the present bearing arrangement is described below with particular reference to FIG. 2. In FIG. 2, the bearing arrangement is illustrated in position between a shaft 29 of the spindle 11 and a portion of the spindle housing 17 which surrounds the bearing arrangement and supports the shaft 29. The bearing arrangement is comprised of a plurality of similar thrust bearing assemblies 31—35 which are arranged in tandem between the shaft 29 and housing 17. The tandem bearing assemblies 31—35, in combination with a backup bearing 36 and a spring arrangement 37 are axially confined relative to the housing 17 by an annular recess 38. The same components are also confined from axial motion relative to the spindle by means of a flange 39 formed at one end of the shaft 29 and a retaining ring 41 threaded onto the other end of the shaft 29. The purpose and function of the backup bearing 36 and spring arrangement 37 is described in greater detail below.

Each of the similar bearing assemblies 31—35 is of the angular contact ball bearing type and includes a number of balls 42 arranged between an inner race 43 and an outer race 44. A pair of self-aligning spacers 46 and 47 is associated with each of the inner races 43 to permit initial alignment of the tandem bearing assemblies. Sizing of the races 43, 44 and the balls 42 is selected to withstand the high rotation speeds common to friction welding machines.

To permit hydraulic loading of each of the bearing assemblies, a hydraulic piston 48 and cylinder 49 is included within each of the bearing assemblies. The cylinders 49 and a spacer ring 51 are coaxially arranged within the angular recess 38 of the housing 17. A fluid cavity 53 is defined between each of the pistons 48 and cylinders 49. Each of the pistons 48 responds to fluid pressure in the cavity 53 by acting against the outer race 44 and urging the race 44 and balls 42 into working alignment with the inner races 43.

The present invention is particularly concerned with the provision of means for equally pressurizing the various bearing assemblies 31—35 to insure that each of the bearing assemblies accepts an equal and proportionate amount of the total axial thrust to be transmitted between the spindle shaft 29 and the spindle housing 17. To accomplish this purpose, a common fluid manifold 54 is in separate and substantially free communication with the piston cavity 53 of each of the bearing assemblies 31—35 by means of inlet ports 56 defined by the housing 17 and a passage 57 defined by the cylinder of each of the bearing assemblies. Working fluid for pressurizing the bearing assemblies is delivered from a source (not shown) through a conduit 58 into the common manifold 54.

With the present bearing arrangement embodied as a portion of the friction welding machine of FIG. 1, it is particularly desirable to pressurize the bearing assemblies 31—35 to develop counterbalancing forces within the bearings simultaneously with the transmission of large axial thrust forces between the spindle and housing 17. Engagement of the workpieces 13 and 14 and axial loading of the bearing arrangement is developed by the hydraulic motors 27 of FIG. 1. In order to simplify the hydraulic system for the friction welding machine and to insure proper pressurization of the bearing assemblies 31—35, fluid from a single source is delivered to both the hydraulic motors 27 and the common manifold 54 through the conduit 58. Accordingly, equal pressure is experienced within the motors 27 and within the piston cavity 53 of each of the bearing assemblies. In this manner, the thrust load developed in the bearing arrangement by engagement of the workpieces 13 and 14 is counterbalanced by an equal load applied to the outer race 44 of each bearing assembly. Counterbalancing the welding thrust load in this manner substantially extends the operating life of the bearing arrangement and insures its proper operation within the friction welding machine. With the assurance that each of the bearing assemblies will accept an equal portion of the axial thrust load, the number of tandem bearing assemblies may be reduced as was discussed above. More importantly, for a given size and number of bearings, the present hydraulically loaded bearing arrangement has a greater load carrying ability and a greatly increased life in comparison with a conventional bearing arrangement.

The present invention further contemplates additional means for insuring that the spindle 11 is maintained in a substantially constant axial position relative to the housing 17. Deflection developed within a thrust bearing of this type by variation of axial thrust forces normally permits some axial deflection of the shaft 29. As a first means of overcoming or compensating for this type of deflection, the present invention contemplates hydraulic preloading of the outer races 44 of bearing assemblies 31—35 by pistons 48. This effectively reduces deflection since any axial motion then occurs in the outer races 44 and not the inner races 43. To preload the bearings 31—35, relatively low-pressure working fluid is introduced into the common manifold 54 from a branch conduit 59. Working fluid is delivered through the branch conduit 59 prior to hydraulic actuation of the motors 27 (See FIG. 1) and development of full counterbalancing pressure in the bearing assemblies 31—35. Check valves 61 and 62 are arranged respectively across the conduits 59 and 58 to prevent reverse flow of working fluid.

As a further means of axially stabilizing the spindle 11, the present invention contemplates pressurizing each of the bearing assemblies 31—35 to develop counterbalancing forces which slightly exceed the axial thrust produced in the shaft 29 by the hydraulic motors 27 of FIG. 1. This is preferably accomplished by forming the pistons 48 of the bearing arrangement with a total hydraulically effective cross-sectional area somewhat greater than the hydraulically effective cross-sectional area of the ram means 27. Preferably the cross-sectional area of pistons 48 exceeds that of the ram means 27 by approximately 1—10 percent so that counterbalancing forces developed within the bearing arrangement exceeds the total axial thrust by the same amount. The excess counterbalancing forces in the tandem bearing assemblies is transmitted to the backup bearing 36 by shaft 29 through retaining ring 41.

In operation, the spindle 11 and workpiece 13 are initially set in rotation by the motor 19. During this portion of the welding cycle, the bearings 31—35 are preloaded by the introduction of working fluid through the conduit 59. A portion of the working fluid delivered into each of the piston cavities 53 is communicated internally of each bearing assembly by a restrictive orifice 66 defined by each of the pistons 48. The restrictive sizing of the orifices 66 does not interfere with proper pressurization of the pistons 48 but permits a limited flow of fluid into the bearing interior for lubricating the raceways of the races 43, 44 which are in contact with the balls 42. The orifices 66 also prevent check valves 61 and 62 from locking fluid pressure in manifold 54.

As the ram motors 27 are hydraulically actuated to bring the workpieces 13 and 14 into engagement, working fluid under equal pressure is delivered to each of the bearing assemblies through the common manifold 54. In this manner, the invention assures that counterbalancing forces are developed within the bearings slightly in excess of the total axial thrust applied to the shaft 29 by engagement of the workpieces 13 and 14. Each of the bearing assemblies 31—35 accordingly accepts a proportionate amount of the axial thrust to be transmitted between the shaft 29 and housing 17. As discussed above, this feature permits a reduction in the number of bearing assemblies employed between the shaft 29 and housing 17 or increases their operating life. Further, this feature permits the bearing assemblies 31—35 to be produced by standard commercial processes where they are subject to normal manufacturing tolerances. Eliminating the necessity for a set of matched bearing assemblies not only reduces the initial cost but also permits replacement of any one of the bearing assemblies 31—35 without the need for installing another mechanically matched set.

Axial stabilization of the spindle 11 is insured by the use of excess counterbalancing force within the bearing arrangement during axial engagement of the workpieces 13 and 14.

We claim:

1. A thrust bearing arrangement for use between a shaft and a supporting housing, the bearing arrangement being effective to permit relative rotation between the shaft and housing and also transmit axial thrust therebetween comprising a plurality of thrust bearings disposed in tandem between the shaft and housing to permit relative rotation and mutually transmit axial thrust therebetween and hydraulic means independently associated with each of the thrust bearings for equally loading each bearing to develop internal counterbalancing forces in the bearing assembly at least approximately equal to the axial force transmitted between the shaft and housing by the tandem bearing arrangement wherein the shaft and housing are embodied in a spindle and spindle housing respectively of a friction welding machine, the spindle being subject to high rotational speeds and high axial loadings relative to its housing.

2. The invention of claim 1 wherein the spindle supports chuck means for mounting one workpiece and further comprising tailstock chuck means for mounting another workpiece, means for driving the spindle in rotation and means for urging the workpieces into axial engagement.

3. The invention of claim 2 wherein each of the plurality of thrust bearings includes a piston and cylinder associated with one of the races for hydraulically developing internal counterbalancing force in the bearing arrangement.

4. The invention of claim 3 further comprising a common manifold in separate communication with a closed chamber between the cylinder and piston of each bearing and a source of working fluid in communication with the manifold.

5. The invention of claim 4 wherein the axial engagement means includes a hydraulic motor in communication with the fluid source which also supplies the common manifold, the motor operably associated with one of the chuck means to urge the workpieces into axial engagement.

6. The invention of claim 5 wherein the hydraulically effective cross-sectional area of the pistons in the bearing arrangement is greater than the hydraulically effective cross-sectional area for the axial engagement motor so that counterbalancing forces developed in the bearing arrangement exceed the axial thrust transmitted between the spindle and housing and further comprising a backup bearing associated with the tandem bearings to absorb the counterbalancing forces developed in the tandem bearings and axially stabilize the spindle relative to its housing.

7. The invention of claim 6 wherein the counterbalancing forces in the bearing arrangement exceed applied axial thrust by approximately 1—10 percent.

8. The invention of claim 6 further comprising self-aligning means associated with each of the plurality of thrust bearings, means for hydraulically preloading the plurality of bearings and wherein each of the plurality of bearings is an angular contact thrust ball bearing.